US008412428B2

(12) United States Patent
Ellis

(10) Patent No.: US 8,412,428 B2
(45) Date of Patent: Apr. 2, 2013

(54) SYSTEM FOR AND METHOD OF DETECTING CLUTCH ENGAGEMENT OF A MANUAL TRANSMISSION

(75) Inventor: Nathaniel Ellis, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 384 days.

(21) Appl. No.: 12/789,862

(22) Filed: May 28, 2010

(65) Prior Publication Data

US 2011/0295476 A1 Dec. 1, 2011

(51) Int. Cl.
*G06F 7/00* (2006.01)

(52) U.S. Cl. ............ 701/67; 700/30; 700/253; 700/254; 702/33; 702/85; 702/96; 702/193

(58) Field of Classification Search .................... 701/67; 700/30, 253, 254; 702/85, 96, 193, 33
See application file for complete search history.

(56) References Cited

U.S. PATENT DOCUMENTS

| | | |
|---|---|---|
| 4,432,445 A | 2/1984 | Windsor |
| 4,561,530 A | 12/1985 | Parsons et al. |
| 4,727,472 A | 2/1988 | Deutsch et al. |
| 4,849,899 A | 7/1989 | Cote et al. |
| 5,393,276 A | 2/1995 | White et al. |
| 5,393,277 A | 2/1995 | White et al. |
| 5,401,223 A | 3/1995 | White et al. |
| 5,498,195 A | 3/1996 | White et al. |
| 5,583,766 A | 12/1996 | Birchenough et al. |
| 5,591,102 A | 1/1997 | White et al. |
| 5,609,548 A | 3/1997 | White et al. |
| 5,638,271 A | 6/1997 | White et al. |
| 5,682,790 A | 11/1997 | Genise |
| 5,842,144 A | 11/1998 | Coutant et al. |
| 5,855,532 A | 1/1999 | Sugiyama |
| 5,957,810 A | 9/1999 | Ohashi et al. |
| 6,058,792 A | 5/2000 | Kosik et al. |
| 6,086,512 A | 7/2000 | Kondo |
| 6,144,911 A | 11/2000 | Binz et al. |
| 6,516,255 B2 | 2/2003 | Jager et al. |
| 6,607,463 B2 | 8/2003 | Jeon |
| 6,675,079 B2 | 1/2004 | Kwon |
| 6,691,011 B1 | 2/2004 | Jacobs |
| 6,752,743 B2 | 6/2004 | Eich et al. |
| 6,849,027 B2 | 2/2005 | Eich et al. |
| 7,044,887 B2 | 5/2006 | Tanaka et al. |
| 7,058,496 B2 | 6/2006 | Ho et al. |
| 2004/0011040 A1* | 1/2004 | Tanaka et al. ................. 60/698 |
| 2007/0207896 A1* | 9/2007 | Radich .......................... 477/107 |
| 2008/0255739 A1 | 10/2008 | Murayama et al. |
| 2009/0165582 A1* | 7/2009 | Tsunashima et al. ........... 74/331 |

FOREIGN PATENT DOCUMENTS

| | | |
|---|---|---|
| JP | 58200052 | 11/1983 |
| JP | 3079817 | 4/1991 |

* cited by examiner

*Primary Examiner* — Ryan Zeender
*Assistant Examiner* — Hunter Wilder
(74) *Attorney, Agent, or Firm* — Plumsea Law Group, LLC

(57) ABSTRACT

A system and method of detecting clutch engagement of a manual transmission of a motor vehicle is disclosed. The system and method include a clutch switch for detecting clutch engagement and a backup method for detecting clutch engagement. The backup method includes varying a target speed of an engine drive shaft of the motor vehicle and comparing the speed of the engine drive shaft with the speed of a mainshaft of the motor vehicle.

12 Claims, 8 Drawing Sheets

SYSTEM FOR AND METHOD OF DETECTING CLUTCH ENGAGEMENT OF A MANUAL TRANSMISSION

BACKGROUND

The present invention relates generally to a motor vehicle, and in particular to a system and method for detecting clutch engagement of a manual transmission for a motor vehicle.

Methods of detecting clutch engagement of manual transmissions for motor vehicles have been previously proposed. Several designs use clutch switches. However, in situations where clutch switches fail, a backup method may be required. One previous design uses two clutch switches. However, the related art lacks provisions for detecting clutch engagement when one or both clutch switches fail. There is a need in the art for a design that provides clutch engagement detection when one or more clutch switches might fail.

SUMMARY

In one aspect, the invention provides a method of detecting clutch engagement of a manual transmission in a motor vehicle, comprising the steps of: receiving information related to an initial mainshaft speed of a mainshaft; changing an engine speed associated with a drive shaft to a temporary engine speed that is substantially different from the mainshaft speed; receiving information related to a current mainshaft speed after the engine speed is changed; and determining if a clutch of the manual transmission is engaged by comparing the temporary engine speed and the current mainshaft speed.

In another aspect, the invention provides a method of detecting clutch engagement of a manual transmission in a motor vehicle, comprising the steps of: controlling an engine speed associated with a drive shaft to substantially equal an initial mainshaft speed of mainshaft; starting a primary mode timer and a clutch switch backup timer when the engine speed is approximately equal to the mainshaft speed; changing the engine speed to a temporary engine speed that is substantially different from the initial mainshaft speed when the primary mode timer expires; receiving information related to a current mainshaft speed after the engine speed is changed; and determining if a clutch is engaged by comparing the temporary engine speed and the current mainshaft speed.

In another aspect, the invention provides a method of operating a drive train for a motor vehicle with a manual transmission, comprising the steps of: automatically controlling an engine speed associated with a drive shaft to substantially equal an initial mainshaft speed of a mainshaft while a clutch of the manual transmission is disengaged and following a gear shift; receiving information from a clutch switch, the clutch switch being associated with a clutch pedal; determining an engagement state of the clutch according to the information from the clutch switch; changing the engine speed to a temporary engine speed that is substantially different from the mainshaft speed; receiving information related to a current mainshaft speed after the engine speed is changed; checking the engagement state of the clutch by comparing the temporary engine speed with the current mainshaft speed; and stopping automatic control of the engine speed when the clutch is engaged.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
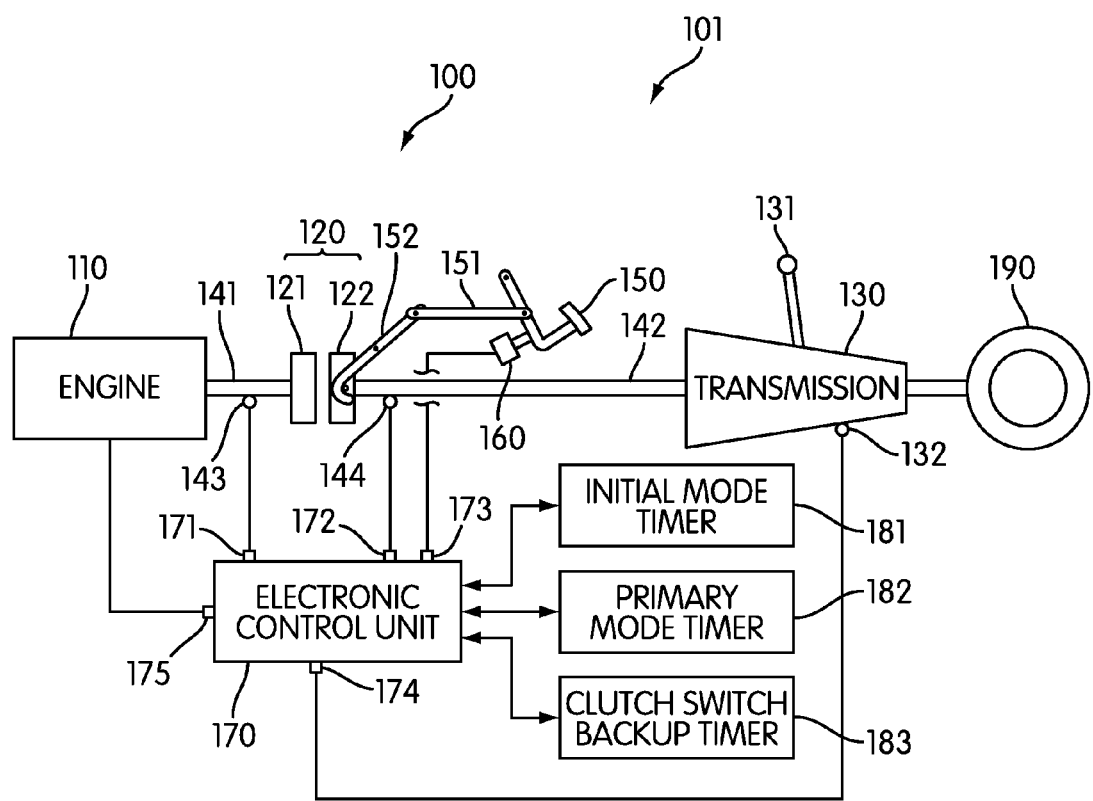
FIG. 1 is a schematic view of an embodiment of a drive train of a motor vehicle.

FIG. 1 is a schematic view of a drive train 100 of motor vehicle 101 according to a first embodiment of the invention. The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drive train is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

Drive train 100 can include engine 110 and manual transmission 130 that are further associated with drive shaft 141 and mainshaft 142, respectively. In some cases, engine 110 and manual transmission 130 can be connected using clutch 120. Clutch 120 may be operated in an engaged state and a disengaged state. In particular, clutch 120 may be operated in an engaged state in which torque is transferred between drive shaft 141 and mainshaft 142 as well as in a disengaged state in which no torque is transferred between drive shaft 141 and mainshaft 142. It will be understood that clutch 120 may also operate in intermediate states between the engaged state and the disengaged state in which some torque is transferred between drive shaft 141 and mainshaft 142.

Generally, any type of clutch known in the art can be used. For purposes of clarity, a particular embodiment of clutch 120 is illustrated in the Figures. However, in other embodiments, any other type of clutch could be used. Examples of different types of clutches that can be used include, but are not limited to: single plate friction clutches, multiple plate friction clutches, dry clutches, wet clutches, dog clutches, cone clutches, overrunning clutches, centrifugal clutches, hydraulic clutches and electromagnetic clutches, as well as any other types of clutches.

In the current embodiment, drive shaft 141 may be attached to flywheel 121 of clutch 120. Mainshaft 142 may be attached to clutch plate 122. Motor vehicle 101 can further include clutch pedal 150 for manually operating clutch 120. Clutch pedal 150 can be further connected to release lever 152 via clutch linkage 151. With this arrangement, when clutch pedal 150 is depressed by a driver of the motor vehicle, clutch linkage 151 causes release lever 152 to move clutch plate 122 out of contact with flywheel 121. Clutch linkage 151 may be a cable, lever, or any other connection known in the art that is satisfactory for the purpose.

In some cases, the position of clutch plate 122 may be controlled using a return spring (not shown). In some cases, the return spring may be associated with a pressure plate assembly that may be part of clutch 120. In some embodiments, the return spring may be a diaphragm spring. Using this arrangement, as clutch pedal 150 returns to the non-depressed position, clutch linkage 151 may move release lever 152 so that clutch plate 122 can return to a position in contact with flywheel 121 due to the force of the return spring. When flywheel 121 and clutch plate 122 are in contact with each other torque from engine 110 can be transferred from drive shaft 141 to mainshaft 142. This provides torque to transmission 130 that can be further transferred to driving wheels 190 of drive train 100.

In some embodiments, transmission 130 can include transmission shifter 131 for switching gears. It will be understood that transmission 130 can be associated with any number of gears or gear ratios. For example, in one embodiment, transmission 130 could be a five speed transmission comprising at least five different gear ratios. In other embodiments, transmission 130 could be a six speed transmission comprising at least six different gear ratios. In still other embodiments, transmission 130 could comprise any other number of gear ratios.

Drive train 100 may comprise one or more components for detecting the operating modes of various components. In some cases, drive train 100 may comprise drive shaft speed sensor 143 for sensing information related to the rotational speed of drive shaft 141. In addition, drive train 100 may comprise mainshaft speed sensor 144 for sensing information related to the rotational speed of mainshaft 142. Generally, any type of sensors for measuring rotational speed known in the art and practical for use in motor vehicles can be used for drive shaft speed sensor 143 and mainshaft speed sensor 144. Examples include, but are not limited to: centrifugal force, Hall effect sensors, stroboscopes, photodiodes as well as any other kind of sensors. In an exemplary embodiment, engine drive shaft speed sensor 143 may be a crank angle sensor. Moreover, in some cases, the speed of driveshaft 141 may be equal to the engine speed of engine 110.

In some embodiments, drive train 100 may comprise clutch switch 160 for detecting the position of clutch pedal 150. In some cases, clutch switch 160 may provide an electrical signal related to the position of clutch pedal 150. In an exemplary embodiment, clutch switch 160 could produce a predetermined electrical signal whenever clutch pedal 150 is depressed, which further indicates that clutch 120 is disengaged. Clutch switch 160 may be a pushbutton momentary contact switch or any other switch known in the art and suitable for providing a signal that clutch pedal 150 is depressed.

In some embodiments, drive train 100 may comprise drive gear detector 132 for detecting the active drive gear of transmission 130. In some cases, drive gear detector 132 may be capable of generating electrical signals that indicate the current drive gear of transmission 130. With this arrangement, drive train 100 may provide information related to the current drive gear as a user shifts the drive gear using manual transmission shifter 131.

Drive train 100 can include provisions for communicating, and in some cases controlling, the various components associated with drive train 100. In some embodiments, drive train 100 may be associated with a computer or similar device. In the current embodiment, drive train 100 may include electronic control unit 170, hereby referred to as ECU 170. In one embodiment, ECU 170 may be configured to communicate with, and/or control, various components of drive train 100. In addition, in some embodiments, ECU 170 may be configured to control additional components of motor vehicle 101 that are not shown.

ECU 170 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 170 are optional. Some embodiments may include a given port or provision, while others may exclude it. The following description discloses many of the possible ports and provisions that can be used, however, it should be kept in mind that not every port or provision must be used or included in a given embodiment.

ECU 170 can include port 171 for receiving information related to the speed of drive shaft 141. In the current embodiment, ECU 170 may receive information from drive shaft speed sensor 143 through port 171. Also, ECU 170 can include port 172 for receiving information related to the speed of mainshaft 142. In the current embodiment, ECU 170 may receive information from mainshaft speed sensor 144 through port 172. In addition, ECU 170 may include port 173 for receiving information related to the position of clutch pedal 150. In the current embodiment, ECU 170 may receive information about the position of clutch pedal 150 from clutch switch 160 through port 173. In some embodiments, ECU 170 can also include port 174 for receiving information related to the current driving gear of transmission 130. In one embodiment, ECU 170 may receive information from driving gear detector 132 through port 174.

In some embodiments, ECU 170 may be in communication with engine 110. In some cases, ECU 170 can include port 175 for sending information to, or receiving information from, engine 110. In one embodiment, ECU 170 can send electric signals that are used to control engine 110 through port 175. For purposes of clarity, the connection between engine 110 and ECU 170 is illustrated schematically. It will be understood that in different embodiments, ECU 170 can control the operation of engine 110, as well as associated components, in various ways. In some cases, for example, ECU 170 may provide control signals to fuel injectors of engine 110 for controlling the amount and timing of fuel injected into the cylinders of engine 110. In other cases, ECU 170 may provide control signals to a throttle of engine 110 for controlling the amount of intake air provided to engine 110. In other cases, ECU 170 may provide control signals to an ignition device of some kind to control the ignition timing of engine 110. In still other cases, ECU 170 may communicate any other kind of information to any electronically controlled components of engine 110 for purposes of controlling engine 110.

In some embodiments, ECU 170 may include provisions for controlling the order of various operations. In some cases, for example, ECU 170 may be associated with one or more timers that facilitate controlling the order of various operations. In the current embodiment, ECU 170 comprises initial mode timer 181, primary mode timer 182 and clutch switch backup timer 183. Each of these timers could be an electronic timer, a mechanical timer, or any other type of timer that is known in the art and suitable for the purpose. Furthermore, in some cases, these timers could be disposed internally as part of the circuitry of ECU 170. In other cases, however, these timers could be external to ECU 170. Moreover, while three different timers are used in the current embodiment, in still other embodiments, any other number of timers could be used. The use of initial mode timer 181, primary mode timer 182 and clutch switch backup timer 183 is discussed in further detail below.

A motor vehicle can include provisions for reducing "shift shock" that may occur as a drive train transitions from one gear to another gear due to differences in the rotational speeds of the drive shaft and the mainshaft. In some cases, following disengagement of the clutch during a gear shift, an electronic control unit of a motor vehicle may be configured to automatically match the rotational speeds of the mainshaft and the drive shaft prior to reengagement of the clutch. In other words, an electronic control unit can be configured to provide automatic rev-matching for a drive train. In an exemplary embodiment, ECU 170 may be configured to automatically control the speed of engine 110 so that drive shaft 141 rotates at a substantially similar speed to mainshaft 142 when clutch 120 is disengaged during a gear shift. This arrangement may provide for a smoother reengagement of clutch 120 that reduces shift shock and provides increased comfort to a driver.

Any known methods for automatically matching the speeds of drive shaft 141 and mainshaft 142 can be used. In an exemplary embodiment, ECU 170 may determine a current engine speed from drive shaft speed sensor 143 and a mainshaft speed from mainshaft speed sensor 144. Moreover, ECU 170 may determine a target speed for engine 110 that is approximately equal to the mainshaft speed. Then, ECU 170 may operate engine 110 to achieve the target engine speed so that drive shaft 141 and mainshaft 142 are rotating at approximately similar speeds to help reduce shift shock. It will be understood that the synchronization of the rotational speeds of drive shaft 141 and mainshaft 142 can be achieved using any known control routines or algorithms.

Figure 2:
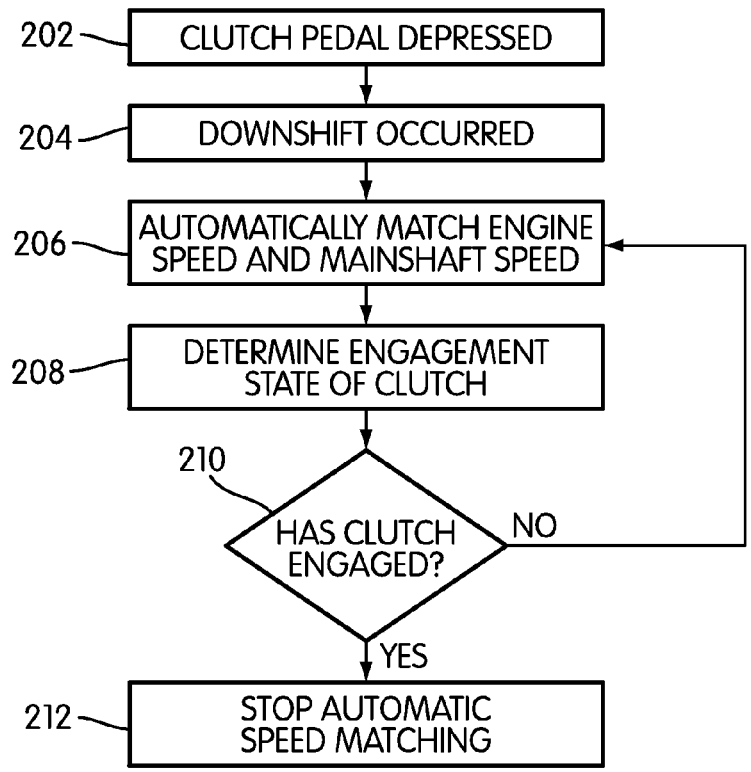
FIG. 2 is an embodiment of a process for controlling the drive train of a motor vehicle.

FIG. 2 is an embodiment of a process for controlling drive train 100. In some embodiments, some of the following steps could be accomplished by electronic control unit 170. In other embodiments, some of the following steps could be accomplished by other components of motor vehicle 101. It will be understood that in other embodiments one or more of the following steps may be optional.

In some cases, the process may begin when ECU 170 receives information that clutch pedal 150 has been depressed by a driver during step 202. In some cases, ECU 170 may receive information from clutch switch 160 to determine that clutch pedal 150 has been depressed. At this point, ECU 170 may determine that clutch 120 has been disengaged so that drive shaft 141 and mainshaft 142 are not physically connected and may rotate at different speeds. Following this, during step 204, ECU 170 receives information that a downshift has occurred. In some cases, ECU 170 may receive information from driving gear detector 132 that indicates that a downshift has occurred. In an exemplary embodiment, driving gear detector 132 may not indicate that a shift has occurred until the synchros of transmission 130 have fully meshed.

Next, during step 206, ECU 170 may begin automatically matching the engine speed and the mainshaft speed. In particular, in some cases, ECU 170 may automatically control the speed of engine 110 so that drive shaft 141 rotates at a substantially similar speed to mainshaft speed 142. Generally, the method of automatically matching the engine speed to the mainshaft speed can be performed using any known methods in the art as discussed above. In an exemplary embodiment, ECU 170 may determine a target engine speed according to a mainshaft speed. ECU 170 may then control engine 110 to achieve the target engine speed which is approximately equal to the mainshaft speed. In some cases, ECU 170 may send a control signal to control the throttle opening of engine 110 and/or the ignition timing of engine 110. In other cases, any other control signals may be used by ECU 170 to control engine 110 to achieve the target engine speed. ECU 170 may continue to monitor the current engine speed and adjust the engine speed until the target engine speed is achieved.

During this process of automatically matching the engine speed to the mainshaft speed, ECU 170 may determine the engagement state of clutch 120 during step 208. In other words, ECU 170 may determine if clutch 120 is in an engaged state or a disengaged state. Next, during step 210, ECU 170 may determine if clutch 120 has engaged. If, during step 210 ECU 170 determines that clutch 120 is still disengaged, ECU 170 may proceed back to step 206 in order to continue automatically adjusting the engine speed to match the mainshaft speed. However, if during step 210 ECU 170 determines that clutch 120 has reengaged, ECU 170 may proceed to step 212 to immediately stop the automatic speed matching of drive shaft 141 and mainshaft 142. This helps to prevent unintended accelerations and/or decelerations that could occur if the engine speed is automatically adjusted once the clutch is reengaged.

A motor vehicle can include provisions for confirming clutch engagement and/or disengagement to prevent problems that may occur when a clutch switch fails. In other words, a motor vehicle can include a backup method for detecting the engagement state of a clutch. In one embodiment, an electronic control unit can be configured to determine the engagement state of a clutch using information related to the drive shaft speed and the mainshaft speed. In particular, in situations where the difference between the mainshaft speed and the drive shaft speed is below a predetermined value or tolerance, the electronic control unit may assume that the clutch is likely engaged. In other words, whenever the mainshaft speed is approximately equal to the drive shaft speed the clutch is likely engaged. In contrast, in situations where the difference between the mainshaft speed and the drive shaft speed is substantially greater than the predetermined value or tolerance, the electronic control unit may assume that the clutch is likely not engaged.

Figure 3:
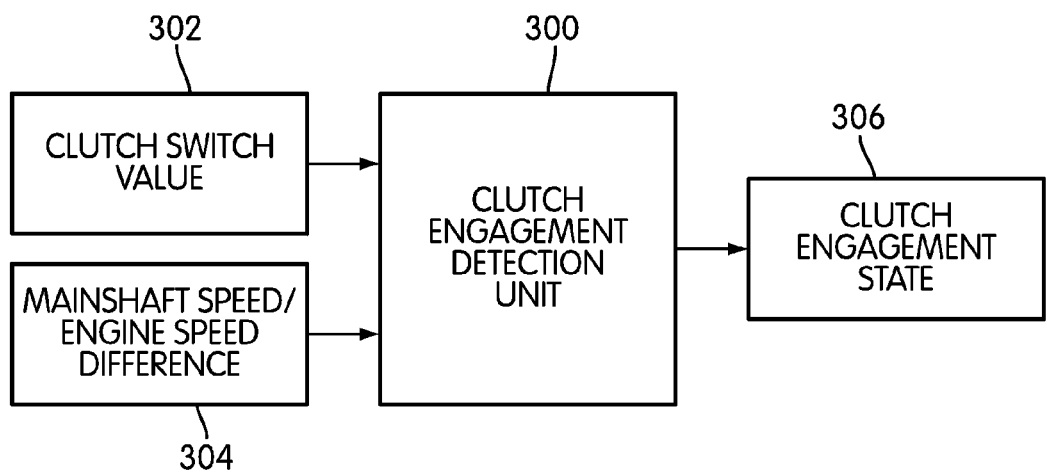
FIG. 3 is a schematic view of an embodiment of a clutch engagement detection unit associated with a control unit of a motor vehicle.

FIG. 3 illustrates an embodiment of clutch engagement detection unit 300. Generally, clutch engagement detection unit 300 may be a program or routine associated with ECU 170 for determining the engagement state of clutch 120. Clutch engagement detection unit 300 may comprise any algorithm or combination of algorithms. In one embodiment, clutch engagement detection unit 300 receives inputs in the form of clutch switch value 302 and mainshaft speed/engine speed difference 304. Clutch switch value 302 is a value that indicates whether clutch pedal 150 is depressed or not depressed according to information received from clutch switch 160. Mainshaft speed/engine speed difference 304, also referred to hereafter as speed difference 304, is the difference in speeds between mainshaft 142 and drive shaft 141. It will be understood that in different embodiments, speed difference 304 could have a positive value or a negative value. In one embodiment, speed difference 304 may be the absolute value of the difference between the current engine speed and the current mainshaft speed.

Clutch engagement detection unit 300 determines the engagement state of clutch 120 by first checking the status of clutch switch 160. In order to confirm the engagement state of clutch 120, clutch switch detection unit 300 further uses the difference in speeds between mainshaft 142 and drive shaft 141 to determine if clutch 120 is engaged or disengaged. Using this information, clutch engagement detection unit 300 may provide clutch engagement state 306 as an output. This arrangement allows for a more reliable indicator of the engagement state of a clutch over methods that use only a clutch switch for determining the engagement state of a clutch.

Figure 4:
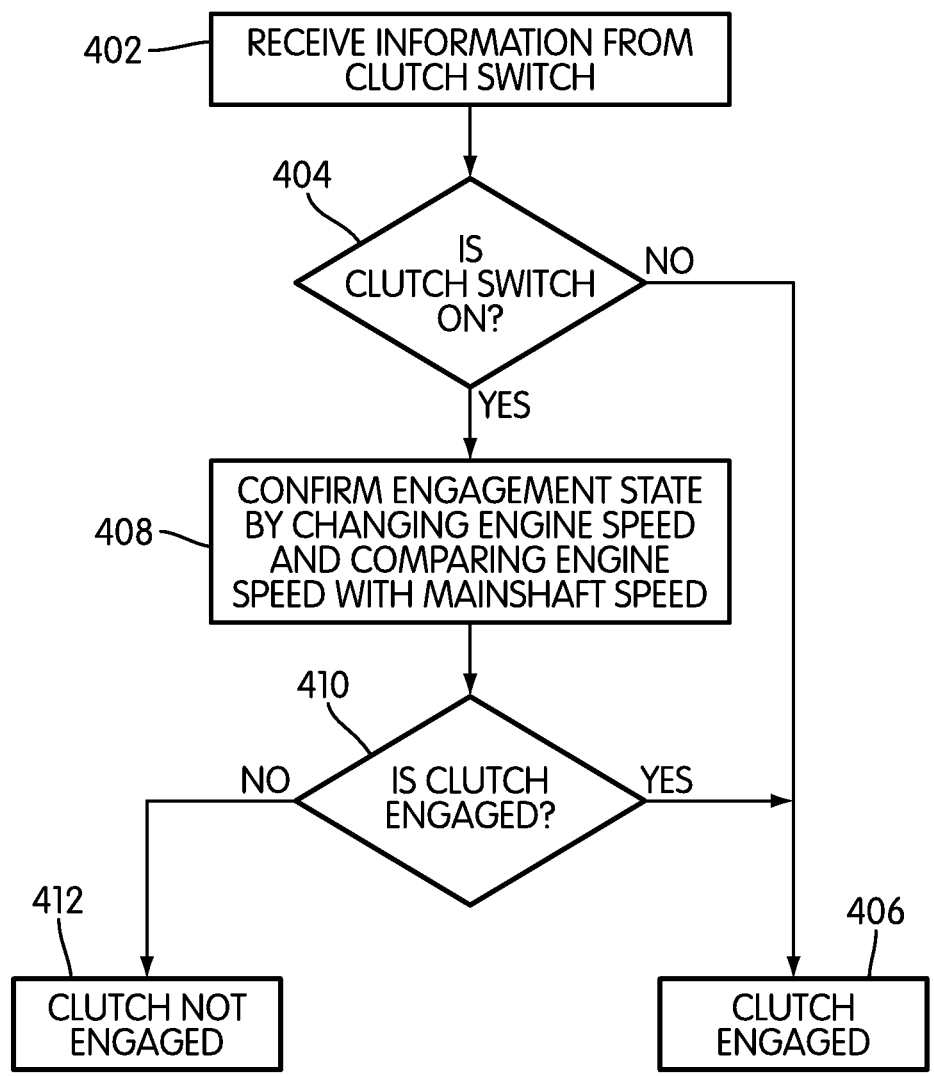
FIG. 4 is an embodiment of a process for controlling the drive train of a motor vehicle.

FIG. 4 illustrates a method of checking clutch engagement. In some embodiments, some of the following steps could be accomplished by ECU 170. In other embodiments, some of the following steps could be accomplished by other components of motor vehicle 101. It will be understood that in other embodiments one or more of the following steps may be optional.

During step 402, ECU 170 may receive information from clutch switch 160. In an exemplary embodiment, clutch switch 160 transmits an electric signal to ECU 170 to indicate the position of clutch pedal 150. In some cases, clutch switch 160 may be configured to operate between an "on" state and an "off" state, corresponding to a depressed position of clutch pedal 150 and a non-depressed position of clutch pedal 150, respectively. In other cases, clutch switch 160 may provide a signal that is linearly related to the position of clutch pedal 150, rather than providing only information about discrete states of clutch pedal 150.

Next, during step 404, ECU 170 may determine if clutch switch 160 is in the on state or the off state. Specifically, when clutch switch 160 is in the on state, clutch pedal 150 is assumed to be depressed and clutch 120 is further assumed to be disengaged. When clutch switch 160 is in the off state, clutch pedal 150 is assumed to be in a non-depressed position and clutch 120 is further assumed to be engaged. If, during step 404, ECU 170 determines that clutch switch 160 is off, ECU 170 may proceed to step 406 where ECU 170 determines that clutch 120 is engaged. If, during step 404, ECU 170 determines that clutch switch 120 is on, ECU 170 may proceed to step 408.

During step 408, ECU 170 may confirm that clutch 120 is disengaged using the backup clutch detection method discussed above. In particular, ECU 170 may change the current engine speed and then compare the engine speed and the mainshaft speed. In situations where the clutch is engaged, the mainshaft speed will also change with the engine speed. However, in situations where the clutch is disengaged, the mainshaft speed will not change substantially as the engine speed is changed. Therefore, this method of comparing the engine speed and the mainshaft speed, or calculating the engine speed/mainshaft speed difference, after the engine speed has been changed, provides a backup method for detecting clutch engagement.

Following step 408, during step 410, ECU 170 may determine if clutch 120 is engaged according to the difference between the engine speed and the mainshaft speed. If clutch 120 is engaged, ECU 170 may proceed to step 406. If clutch 120 is disengaged, ECU 170 may proceed to step 412. During step 412, ECU 170 may set the clutch state as disengaged. As previously discussed, once ECU 170 detects that clutch 120 is engaged, ECU 170 may stop automatically controlling engine 110 to prevent any accelerations unintended by the driver. However, as long as clutch 120 remains disengaged, ECU 170 may continue to match the speeds of drive shaft 141 and mainshaft 142.

Figure 5:
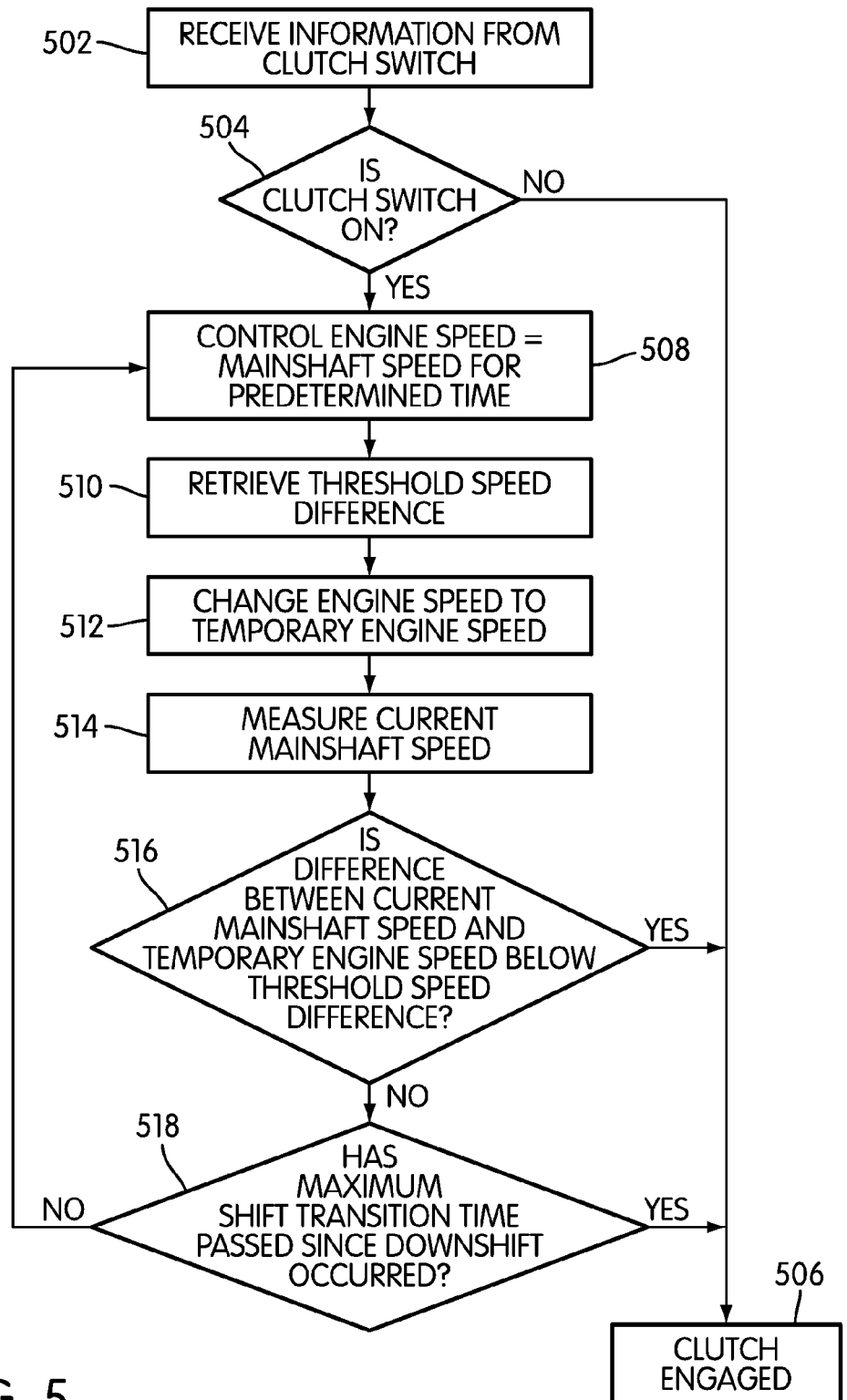
FIG. 5 is an embodiment of a process of controlling the drive train of a motor vehicle.

FIG. 5 illustrates an embodiment of a detailed process of checking the engagement state of a clutch. In some embodiments, some of the following steps could be accomplished by ECU 170. In other embodiments, some of the following steps could be accomplished by other components of motor vehicle 101. It will be understood that in other embodiments one or more of the following steps may be optional.

During step 502, ECU 170 may receive information from clutch switch 160. Next, during step 504, ECU 170 may determine if clutch switch 160 is on. If clutch switch 160 is not on, ECU 170 may proceed to step 506, where ECU 170 determines that clutch 120 is engaged. If, during step 504, ECU 170 determines that clutch switch 160 is on, ECU 170 may proceed instead to step 508.

During step 508, ECU 170 may control engine 110 so that the engine speed is approximately equal to an initial mainshaft speed for a predetermined time. This allows for a predetermined time in which a driver may smoothly reengage the clutch following a gear shift. The predetermined time can be any amount of time and may be selected according to any criteria.

Following step 508, ECU 170 may proceed to step 510. During step 510, ECU 170 may retrieve a threshold speed difference. The threshold speed difference may be associated with a tolerance of the difference between the engine speed and the mainshaft speed associated with measurement errors and/or some slipping of a clutch. In other words, when the absolute value of the mainshaft speed/engine speed difference is less than the threshold speed difference, the difference in rotational speeds may be considered negligible. However, when the absolute value of the mainshaft speed/engine speed difference is greater than the threshold speed difference, the difference in rotational speeds may indicate that the clutch is disengaged. The threshold speed difference can be selected according to any criteria.

During step 512, ECU 170 may change the engine speed to a temporary engine speed that is above or below the initial mainshaft speed. In some cases, the temporary engine speed may be selected so that the difference between the initial mainshaft speed and the temporary engine speed is substantially greater than the threshold speed difference. This may allow for more accurate clutch state detection during later steps.

Next, during step 514, ECU 170 may measure the current mainshaft speed. It will be understood that the current mainshaft speed is associated with a measurement of the mainshaft speed after the engine speed has been changed to the temporary engine speed. In particular, the current mainshaft speed may be different from the initial mainshaft speed that is measured when the engine speed and the mainshaft speed are automatically matched during step 508. In particular, when clutch 120 is disengaged, the initial mainshaft speed and the current mainshaft speed may be substantially different. However, when clutch 120 is engaged, the initial mainshaft speed and the current mainshaft speed could have substantially similar values. In some cases, the current mainshaft speed can be determined using information received from mainshaft speed sensor 144. At this point, since ECU 170 has changed the engine speed to the temporary engine speed, the speed of drive shaft 141 is known. However, in some cases, the speed of drive shaft 141 may be confirmed using information from drive shaft speed sensor 143.

Following step 514, during step 516, ECU 170 may determine if the difference between the current mainshaft speed and the temporary engine speed is below the threshold speed difference. In some cases, the absolute value of the difference between current mainshaft speed and temporary engine speed can be compared with the threshold speed difference. If, during step 516, ECU 170 determines that the difference between the current mainshaft speed and the temporary engine speed is below the threshold speed difference, ECU 170 may proceed to step 506. In some cases, at this point, ECU 170 may determine that clutch switch 160 is malfunctioning and may take any appropriate actions for warning a driver or engaging in diagnostics.

If, during step 516, ECU 170 determines that the difference between the current mainshaft speed and the temporary engine speed is larger than the threshold value, ECU 170 may proceed to step 518. During step 520, ECU 170 determines if a maximum shift transition time has passed since the shift occurred. The maximum shift transition time corresponds to a maximum period of time for which a clutch may be likely disengaged following a gear shift. If so, ECU 170 proceeds to step 506, since it may be assumed that clutch 120 has been reengaged at this point. Otherwise, ECU 170 proceeds to step back to step 508. At this point, steps 508 through 518 can be repeated multiple times until the maximum shift transition time has passed.

Figure 6:
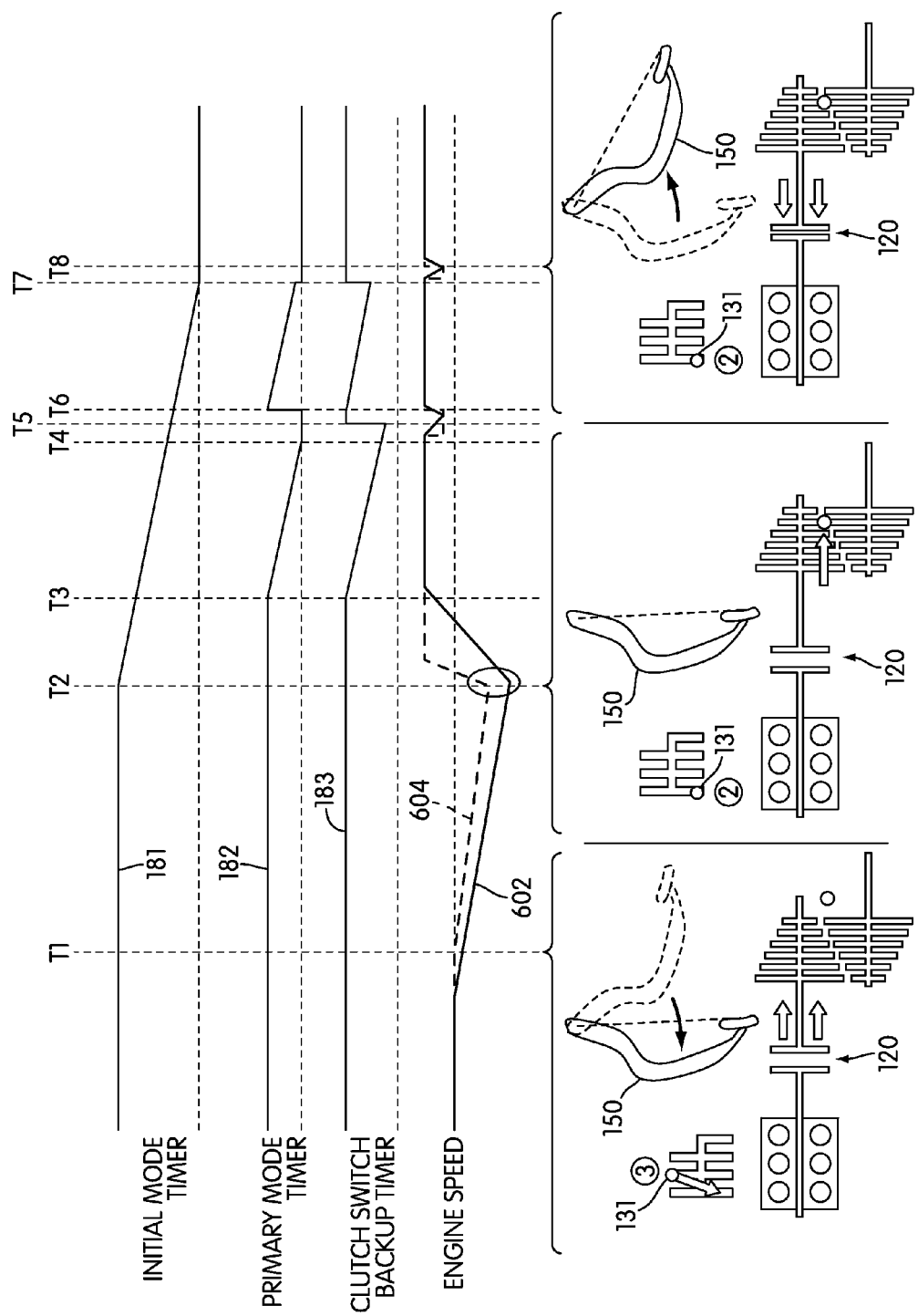
FIG. 6 is an embodiment of a time line of operation of a process for controlling the drive train of a motor vehicle.

FIG. 6 illustrates an embodiment of a timeline for operating a drive train control system according to the methods discussed above. In particular, the current embodiment illustrates one possible implementation of a system for controlling a drive train using a plurality of timers to precisely control the timing for the various steps discussed above. It should be understood that the current embodiment is only meant to be illustrative and in other embodiments the various steps discussed above could be accomplished using any other arrangement of timers or other methods for ordering the various steps.

Referring to FIG. 6, the relationship of initial mode timer 181, primary mode timer 182 and clutch switch backup timer 183 and engine speed 602 are illustrated as a function of time. At time T1, clutch pedal 150 is depressed and transmission shifter 131 may be downshifted from third gear towards second gear. At this point, clutch 120 begins to disengage. As clutch 120 disengages, engine speed 602 starts to drop below target engine speed 604, which is approximately equal to the mainshaft speed at this point.

Later, at time T2, the downshift has finished, with transmission shifter 131 now in second gear. In other words, the synchros of transmission 130 are fully meshed. At this point, initial mode timer 181 is started. Initial mode timer 181 is configured to count down for a period that corresponds to the maximum shift transition time. In other words, initial mode timer 181 has a duration that corresponds to the maximum amount of time over which a clutch may be likely disengaged during a shift. Therefore, initial mode timer 181 provides a maximum amount of time for automatically controlling the engine speed to match the transmission speed. Following time T2, and prior to time T3, engine speed 602 is automatically controlled to match target engine speed 604 in order to provide a smoother transition for clutch reengagement. Target engine speed, at this time, is the same as the measured speed of mainshaft 142. In this case, downshifting of transmission 130 at time T2 results in an increase in measured speed of mainshaft 142 which, in turn, results in an increase in the target speed of engine 110 and drive shaft 141.

At time T3, once current engine speed 602 is substantially equal to target engine speed 604, primary mode timer 182 and clutch switch backup timer 183 may also be started. Primary mode timer 182 has a duration that corresponds to the predetermined time for holding the engine speed equal to the mainshaft speed in order to prevent shift shock. Clutch switch backup timer 183 has a duration that is slightly longer than primary mode timer 182.

At time T4, primary mode timer 182 expires. At this point, target engine speed 604 is reduced to a value below the current mainshaft speed. In other words, the target engine speed is set to the temporary engine speed discussed above. This reduced value may be selected so that the difference between the temporary engine speed and the current mainshaft speed is greater than the allowed tolerance between the engine speed and the mainshaft speed when the clutch is connected. The current engine speed is then changed to match the new target engine speed. In other words, the engine speed is changed to the temporary engine speed. At time T5, which occurs after time T4, clutch switch backup timer 183 expires. At this point, the temporary engine speed and the current mainshaft speed are compared to determine if the clutch is engaged.

As long as the clutch is not engaged at time T5, clutch switch backup timer 183 and primary mode timer 182 may be reset at time T6, which follows time T5. At this point, engine speed 602 is automatically controlled to match the current mainshaft speed for the duration of clutch switch backup timer 183 to provide for more time for smooth reengagement of the clutch.

At time T7, initial mode timer 181 may expire. At this point, target engine speed 604 is lowered below the current mainshaft speed. In particular, target engine speed 604 is lowered to the temporary engine speed. At time T8 which occurs soon after time T7, a measurement of the current engine speed and the current mainshaft speed is made to determine if the clutch is engaged.

While the above description only provides for two reductions in target speed to determine whether clutch 120 is engaged, any number of such reductions may be used as long as the time period is not extended so much that it would cause a noticeable reduction in the smoothness of engine operation and/or safety problems.

Figure 7:
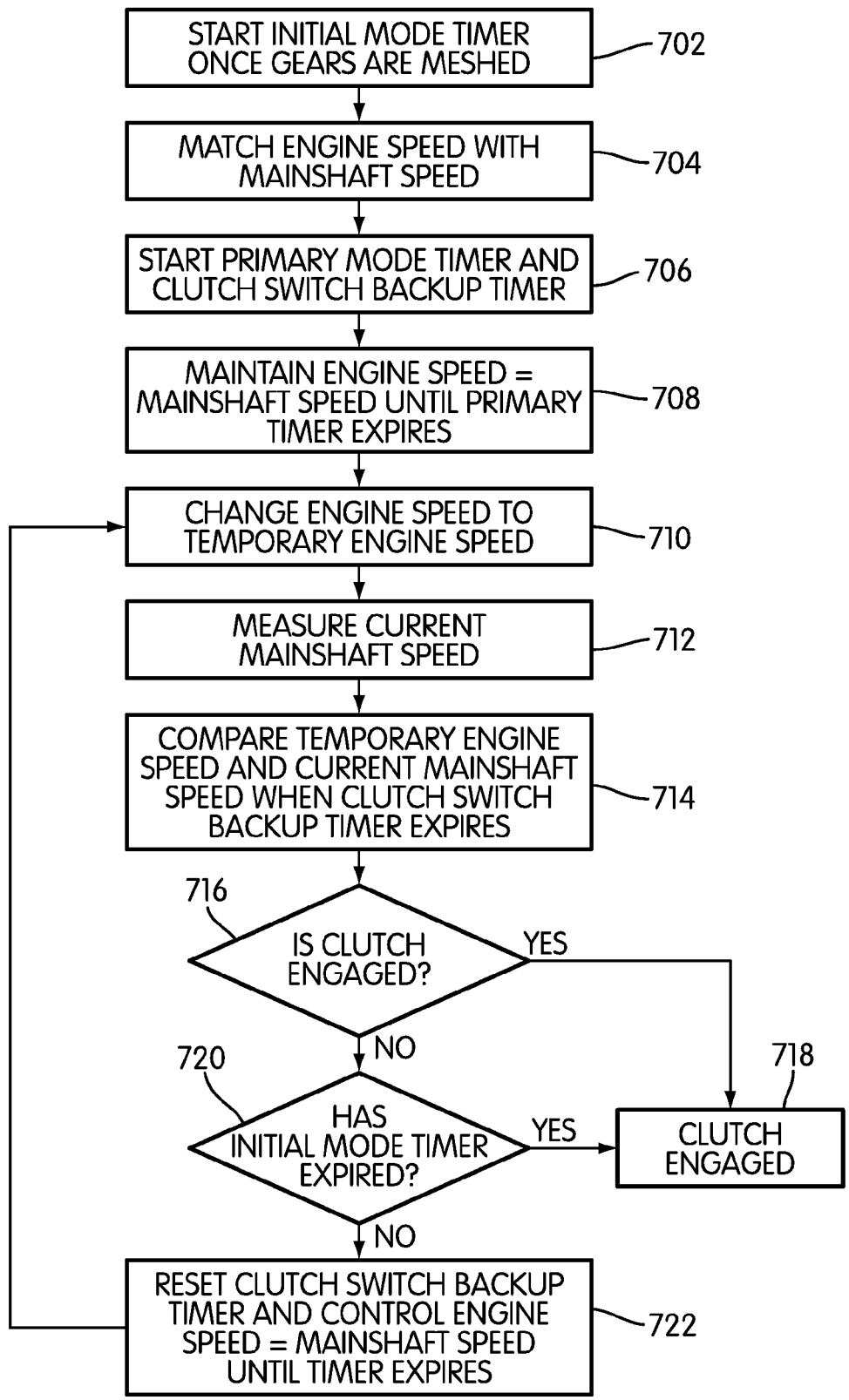
FIG. 7 is an embodiment of a process of controlling the drive train of a motor vehicle using timers.

FIG. 7 illustrates an embodiment of a method of detecting clutch engagement during a transmission shift using a plurality of timers as described above. In some embodiments, some of the following steps could be accomplished by ECU 170. In other embodiments, some of the following steps could be accomplished by other components of motor vehicle 101. It will be understood that in other embodiments one or more of the following steps may be optional.

During step 702, ECU 170 may start initial mode timer 181 once the gears of transmission 130 have fully meshed following a downshift or an upshift. Next, during step 704, ECU 170 may match the engine speed with the mainshaft speed. In some cases, the initial mainshaft speed can be determined using mainshaft speed sensor 144. Following this, during step 706, ECU 170 may start primary mode timer 182 and clutch switch backup timer 183 once the mainshaft speed and the engine speed are matched. Next, during step 708, ECU 170 may maintain the engine speed equal to the initial mainshaft speed until primary mode timer 182 expires to allow time for the clutch to be smoothly reengaged.

Following the expiration of primary mode timer 182, during step 710, ECU 170 may automatically change the engine speed to the temporary engine speed. Following this, during step 712, ECU 170 may measure the current mainshaft speed. In situations where clutch 120 is engaged, the current mainshaft speed may not be substantially different from the initial mainshaft speed determined during step 704. However, in situations where clutch 120 is disengaged, the current mainshaft speed may be substantially different from the initial mainshaft speed. In some cases, the current mainshaft speed can be determined using information received from mainshaft speed sensor 144. At this point, since ECU 170 has changed the engine speed to the temporary engine speed, the speed of drive shaft 141 is known. However, in some cases, the speed of drive shaft 141 may be confirmed using information from drive shaft speed sensor 143.

During step 714, once clutch switch backup timer 183 expires, ECU 170 may compare the temporary engine speed and the current mainshaft speed. Following step 714, during step 716, ECU 170 may determine if clutch 120 is engaged. If so, ECU 170 may proceed to step 718 to set the clutch engagement state to engaged. Otherwise, ECU 170 may proceed to step 720. During step 720, ECU 170 may determine if initial mode timer 181 has expired. If so, ECU 170 may proceed to step 718. Otherwise, ECU 170 may proceed to step 722. During step 722, ECU 170 may reset clutch switch backup timer 183 and control the engine speed to match the mainshaft speed until clutch switch backup timer 183 expires. Then, following step 722, ECU 170 may proceed back to step 710 to readjust the engine speed for purposes of performing another backup check. In some cases, step 710 through step 722 can be repeated until initial mode timer 181 expires or clutch 120 reengages.

It will be understood that the entire procedure of testing for clutch engagement may occur within a fraction of a second so that a driver and passengers of the motor vehicle may not even perceive the reductions in the speed of the engine. For example, in some cases, some of the timers can be set to expire after time intervals on the order of milliseconds or microseconds.

Using the methods discussed above, a control unit of a motor vehicle may confirm the clutch engagement state determined by a clutch switch by comparing the mainshaft speed with the drive shaft speed. Moreover, the method discussed here includes provisions for adjusting the engine speed for substantially brief periods of time in order to check clutch engagement. This allows the drive shaft speed and the mainshaft speed to be matched for a majority of the time period between clutch disengagement and clutch reengagement in order to provide for a smoother transition when the clutch is reengaged.

Figure 8:
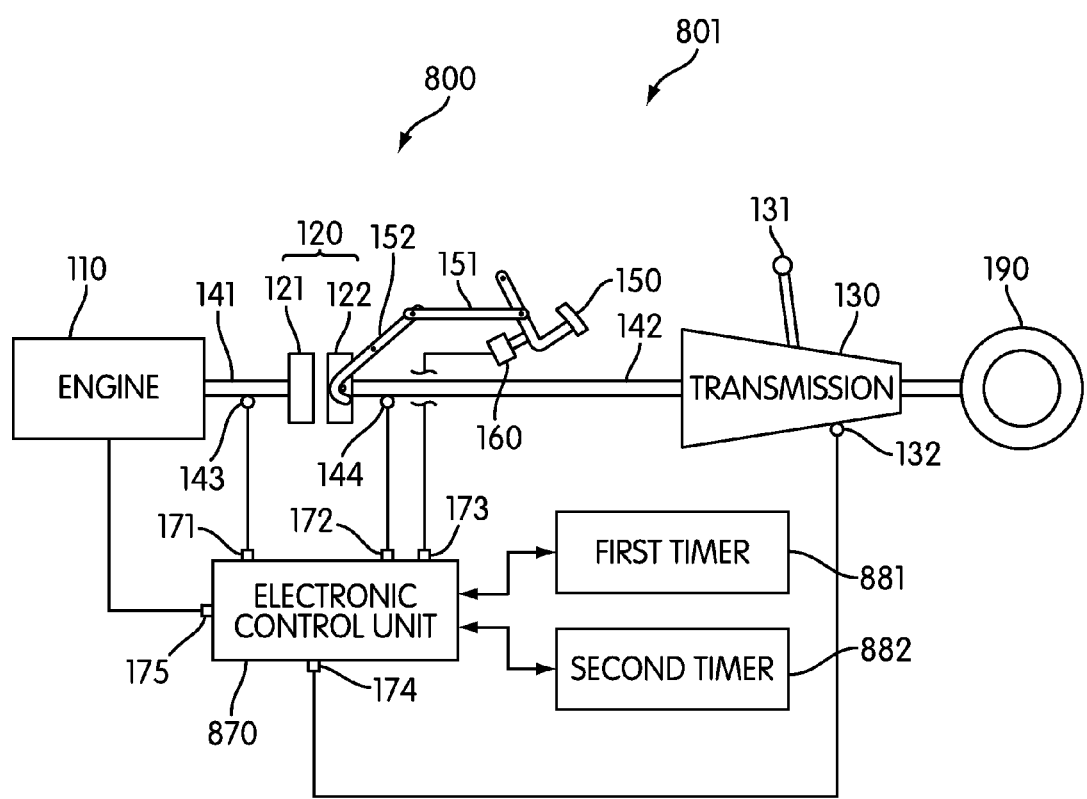
FIG. 8 is a schematic view of another embodiment of a drive train of a motor vehicle.

FIG. 8 illustrates another embodiment of a drive train 800 for motor vehicle 801. Drive train 800 may be substantially similar to drive train 100 of the previous embodiment. In particular, drive train 800 may comprise substantially all of the same parts (identified using identical numbers) as drive train 100. One difference is the use of ECU 870 in the current embodiment. ECU 870 is provided with similar ports for communicating with various components of drive train 800.

However, in this case, ECU 870 is provided with two timers, rather than the three timers of the previous embodiments. In particular, ECU 870 includes first timer 881 and second timer 882. Both of these timers could be an electronic timer, a mechanical timer, or any other type of timer that is known in the art and suitable for the purpose. Furthermore, in some cases, these timers could be disposed internally as part of the circuitry of ECU 870. In other cases, however, these timers could be external to ECU 870. Moreover, while two different timers are used in the current embodiment, in still other embodiments, any other number of timers could be used. The use of first timer 881 and second timer 882 will be discussed in further detail below.

Figure 9:
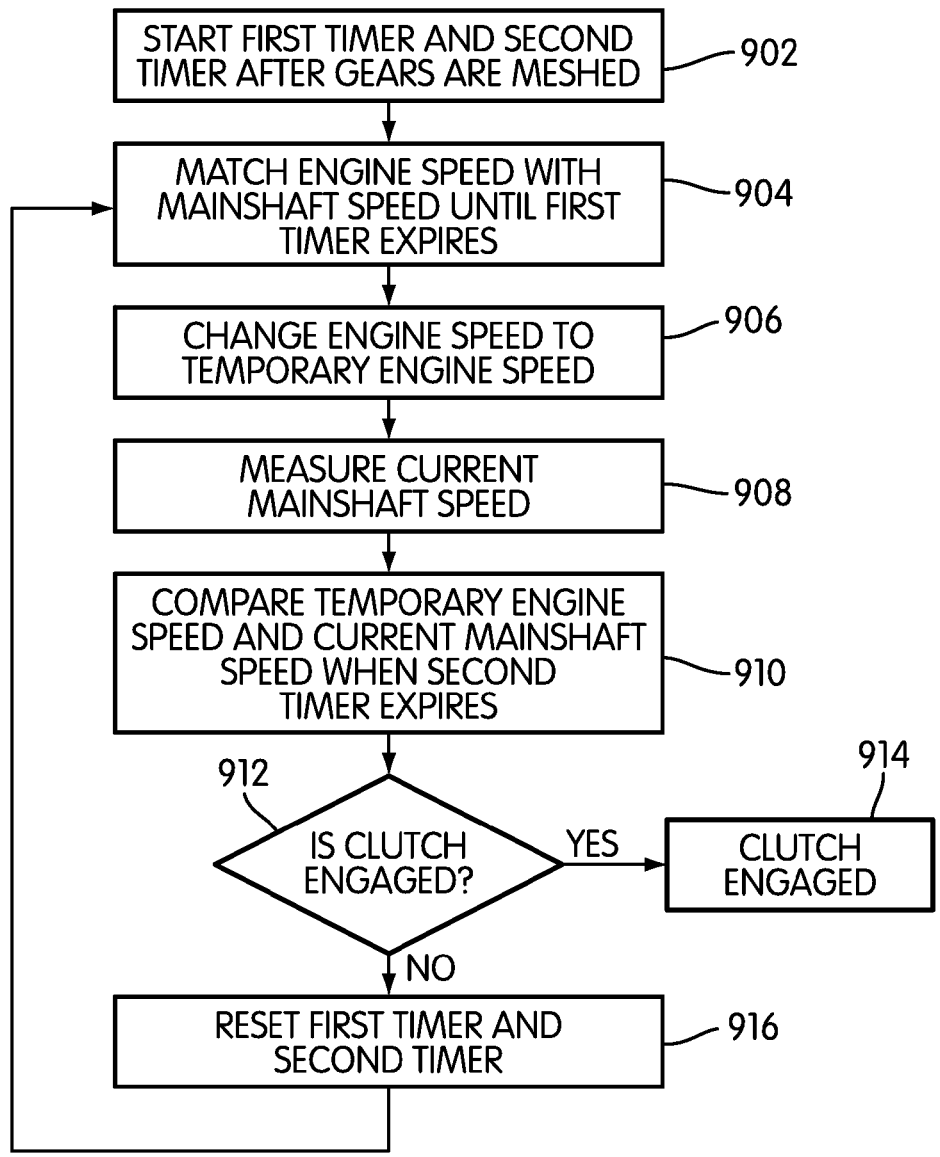
FIG. 9 is an embodiment of a process for controlling the drive train of the motor vehicle.

FIG. 9 illustrates an embodiment of a method of controlling a drive train for a motor vehicle. In some embodiments, some of the following steps could be accomplished by electronic control unit 870. In other embodiments, some of the following steps could be accomplished by other components of motor vehicle 801. It will be understood that in other embodiments one or more of the following steps may be optional.

During step 902, ECU 870 may start first timer 881 and second timer 882 once the gears of transmission 130 have fully meshed. Next, during step 904, ECU 870 may match the engine speed with the mainshaft speed until first timer 881 expires. Next, during step 906, ECU 870 may change the engine speed to a temporary engine speed that is substantially different from the initial mainshaft speed. Following step 906, during step 908, ECU 870 may measure the current mainshaft speed.

Next, during step 910, ECU 870 may compare the temporary engine speed and the current mainshaft speed when second timer 882 expires. Following this, during step 912, ECU 870 may determine if clutch 120 is engaged. If so, ECU 870 may proceed to step 914 to store the engagement state as engaged. Otherwise, ECU 870 may proceed to step 916. During step 916, ECU 870 may reset first timer 881 and second timer 882. After this, ECU 870 may proceed to step 904 in order to match the engine speed and the mainshaft speed again until first timer 881 expires. At this point, in some cases, steps 904 through 914 may be repeated multiple times until the clutch has been reengaged. In other cases, first timer 881 and second timer 882 could be reset a finite number of times before the program or routine ends.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of detecting clutch engagement of a manual transmission in a motor vehicle, the motor vehicle including an electronic control unit that is programmed to perform the steps of:
    starting an initial mode timer;
    controlling an engine speed associated with a drive shaft to substantially equal an initial mainshaft speed of a mainshaft;
    starting a primary mode timer and a clutch switch backup timer when the engine speed is approximately equal to the initial mainshaft speed;
    changing the engine speed to a temporary engine speed that is substantially different from the initial mainshaft speed when the primary mode timer expires;
    receiving information related to a current mainshaft speed after the engine speed is changed from a mainshaft speed sensor in communication with the electronic control unit;
    determining if a clutch is engaged by comparing the temporary engine speed and the current mainshaft speed; and
    wherein the clutch is determined to be engaged when the initial mode timer expires.

2. The method according to claim 1, wherein the steps of (i) starting the primary mode timer and the clutch switch backup timer, (ii) changing the engine speed to the temporary engine speed, and (iii) receiving information related to the current mainshaft speed are repeated until the initial mode timer expires.

3. The method according to claim 2, wherein the duration of the initial mode timer is substantially greater than the duration of the primary mode timer.

4. The method according to claim 2, wherein the duration of the initial mode timer is substantially greater than the duration of the clutch switch backup timer.

5. The method according to claim 1, wherein the duration of the primary mode timer is greater than the duration of the clutch switch backup timer.

6. The method according to claim 1, wherein the amount of time that the engine speed is controlled to match the mainshaft speed is substantially greater than the amount of time that the engine speed is changed to the temporary engine speed.

7. A method of operating a drive train for a motor vehicle with a manual transmission, the motor vehicle including an electronic control unit that is programmed to perform the steps of:
    starting an initial mode timer;
    automatically controlling an engine speed associated with a drive shaft to substantially equal an initial mainshaft speed of a mainshaft while a clutch of the manual transmission is disengaged and following a gear shift;
    receiving information from a clutch switch, the clutch switch being associated with a clutch pedal;
    determining an engagement state of the clutch according to the information from the clutch switch;
    starting a primary mode timer and a clutch switch backup timer when the engine speed is approximately equal to the initial mainshaft speed;
    changing the engine speed to a temporary engine speed that is substantially different from the initial mainshaft speed when the primary mode timer expires;
    receiving information related to a current mainshaft speed after the engine speed is changed;
    checking the engagement state of the clutch by comparing the temporary engine speed with the current mainshaft speed;
    stopping automatic control of the engine speed when the clutch is engaged; and
    wherein if the engagement state of the clutch is not determined to be engaged, determining the clutch to be engaged when the initial mode timer expires.

8. The method according to claim 7, wherein the clutch switch has an on state associated with a depressed position of the clutch pedal and wherein the clutch switch has an off state associated with a non-depressed state of the clutch pedal.

9. The method according to claim 7, wherein the temporary engine speed and the current mainshaft speed are compared until the clutch switch backup timer expires.

10. The method according to claim 7, wherein the current mainshaft speed is determined using information from a mainshaft speed sensor.

11. The method according to claim 7, wherein the method includes a step of retrieving a threshold speed difference.

12. The method according to claim 11, wherein step of checking the clutch engagement includes a step of comparing the difference between the temporary engine speed and the current mainshaft speed with the threshold speed difference.

* * * * *